US010418632B2

(12) United States Patent
Park et al.

(10) Patent No.: US 10,418,632 B2
(45) Date of Patent: Sep. 17, 2019

(54) BINDER COMPOSITION FOR SECONDARY BATTERIES, ELECTRODE USING THE SAME, AND LITHIUM SECONDARY BATTERY

(71) Applicant: LG Chem, Ltd., Seoul (KR)

(72) Inventors: Eun Joo Park, Daejeon (KR); Dong Jo Ryu, Daejeon (KR); Min Ah Kang, Daejeon (KR)

(73) Assignee: LG Chem, Ltd. (KR)

( * ) Notice: Subject to any disclaimer, the term of this patent is extended or adjusted under 35 U.S.C. 154(b) by 476 days.

(21) Appl. No.: 14/904,885

(22) PCT Filed: Aug. 14, 2014

(86) PCT No.: PCT/KR2014/007565
§ 371 (c)(1),
(2) Date: Jan. 13, 2016

(87) PCT Pub. No.: WO2015/026102
PCT Pub. Date: Feb. 26, 2015

(65) Prior Publication Data
US 2016/0233512 A1 Aug. 11, 2016

(30) Foreign Application Priority Data
Aug. 19, 2013 (KR) .................. 10-2013-0097689

(51) Int. Cl.
| H01M 4/62 | (2006.01) |
| H01M 10/0525 | (2010.01) |
| H01M 4/13 | (2010.01) |
| H01M 10/052 | (2010.01) |
| H01M 2/02 | (2006.01) |
| H01M 2/16 | (2006.01) |
| H01M 10/0568 | (2010.01) |
| H01M 10/0569 | (2010.01) |
| H01M 4/133 | (2010.01) |
| H01M 4/1393 | (2010.01) |

(52) U.S. Cl.
CPC ............ *H01M 4/622* (2013.01); *H01M 4/13* (2013.01); *H01M 10/052* (2013.01); *H01M 10/0525* (2013.01); *H01M 2/024* (2013.01); *H01M 2/026* (2013.01); *H01M 2/0207* (2013.01); *H01M 2/0262* (2013.01); *H01M 2/1653* (2013.01); *H01M 4/133* (2013.01); *H01M 4/1393* (2013.01); *H01M 4/625* (2013.01); *H01M 10/0568* (2013.01); *H01M 10/0569* (2013.01); *H01M 2220/20* (2013.01); *H01M 2220/30* (2013.01); *Y02E 60/122* (2013.01); *Y02T 10/7011* (2013.01)

(58) Field of Classification Search
None
See application file for complete search history.

(56) References Cited

U.S. PATENT DOCUMENTS

| 9,583,768 B2 | 2/2017 | Sonobe et al. |
| 2003/0113626 A1 | 6/2003 | Maeda et al. |
| 2006/0058462 A1 | 3/2006 | Kim et al. |
| 2014/0349185 A1 | 11/2014 | Momose et al. |
| 2015/0125746 A1* | 5/2015 | Sonobe ................ H01M 4/133 429/217 |

FOREIGN PATENT DOCUMENTS

| CN | 1720628 A | 1/2006 |
| CN | 104321913 A | 1/2015 |
| EP | 2592678 A1 | 5/2013 |
| EP | 2869372 A1 | 5/2015 |
| JP | 2006066400 A | 3/2006 |
| JP | 2010040228 A | 2/2010 |
| JP | 2010146871 A | 7/2010 |
| JP | 2011171180 A | 9/2011 |
| JP | 2013077526 A | 4/2013 |
| KR | 20040078927 A | 9/2004 |
| KR | 100582518 B1 | 5/2006 |
| KR | 20080034218 A | 4/2008 |
| KR | 20120014634 A | 2/2012 |
| WO | 2006107173 A1 | 10/2006 |
| WO | 2013105623 A1 | 7/2013 |

OTHER PUBLICATIONS

Supplementary European Search Report for Application No. EP14838456, dated Nov. 21, 2016.
International Search Report for Application No. PCT/KR2014/007565 dated Nov. 20, 2014.

* cited by examiner

*Primary Examiner* — Amanda J Barrow
(74) *Attorney, Agent, or Firm* — Lerner, David, Littenberg, Krumholz & Mentlik, LLP

(57) ABSTRACT

Disclosed is a binder composition for secondary batteries, wherein conjugated diene latex particles (A) having an average particle diameter of 50 nm or more and 200 nm or less and acrylic copolymer latex particles (B) having an average particle diameter of 300 nm or more and 700 nm or less are present as an independent phases, and the acrylic copolymer latex particles (B) are included in an amount of 1% to 30% by weight based on a mass of a solid. When the binder composition according to the present invention is applied to an electrode mixture and lithium secondary battery, superior binding force may be maintained between electrode materials and between an electrode material and a current collector, which suffer volume change during charge/discharge, and a secondary battery having superior initial capacity and efficiency may be provided. In addition, thickness increase and gas generation are decreased at high temperature and thus swelling is decreased, whereby a battery having enhanced safety may be provided.

3 Claims, No Drawings

BINDER COMPOSITION FOR SECONDARY BATTERIES, ELECTRODE USING THE SAME, AND LITHIUM SECONDARY BATTERY

CROSS-REFERENCE TO RELATED APPLICATION

This application is a national phase entry under 35 U.S.C. § 371 of International Application No. PCT/KR2014/007565, filed on Aug. 14, 2014, which claims priority to Korean Patent Application No. 10-2013-0097689, filed on Aug. 19, 2013, the disclosures of which are incorporated herein by reference.

TECHNICAL FIELD

The present invention relates to a binder composition for secondary batteries, an electrode using the same and a lithium secondary battery.

BACKGROUND ART

In line with rapid increase in use of fossil fuels, demand for alternative energy or clean energy is increasing. Thus, the field of power generation and electrochemical electricity storage is most actively studied.

As a representative example of electrochemical devices using electrochemical energy, secondary batteries are currently used and use thereof is gradually expanding.

Recently, as technology for portable devices, such as portable computers, portable phones, cameras, and the like, continues to develop and demand therefor continues to increase, demand for secondary batteries as energy sources is rapidly increasing. Among these secondary batteries, research on lithium secondary batteries having high energy density, high operating potential, long cycle lifespan and low self-discharge rate has been underway and such lithium secondary batteries are commercially available and widely used.

In addition, as interest in environmental problems is increasing, research into electric vehicles, hybrid electric vehicles, and the like that can replace vehicles using fossil fuels, such as gasoline vehicles, diesel vehicles, and the like, which are one of the main causes of air pollution, is underway, and lithium secondary batteries are being used as a power source of electric vehicles, hybrid electric vehicles, and the like.

In general, lithium secondary batteries are charged and discharged through a process wherein lithium ions of a positive electrode are repeatedly intercalated and deintercalated at a negative electrode. As such lithium ions are repeatedly intercalated and deintercalated, a bond between an electrode active material or a conductive material becomes loose and contact resistance between particles increases. As a result, ohmic resistance of an electrode increases and thus battery properties may be deteriorated. Accordingly, since a binder should perform buffer action for expansion and contraction of an electrode active material due to intercalation and deintercalation of lithium ions in an electrode, a polymer having elasticity is preferable.

In addition, a binder should have adhesion such that binding capacity between an electrode active material and a current collector is maintained in a process of drying a plate. In particular, when natural graphite having a theoretical discharge capacity of 372 mAh/g is used with a material such as silicon, tin or silicon-tin alloy having high discharge capacity so as to increase discharge capacity, volume expansion dramatically decreases as charge and discharge proceed and thus a negative electrode material is desorbed. As a result, battery capacity may be dramatically decreased with increasing number of charge and discharge cycles.

Furthermore, since electrolyte swelling of a binder affects volume expansion of lithium ion batteries, a binder having low electrolyte swelling is required. Lithium ion batteries swell due to gas generated when an electrolyte inside the batteries is decomposed. Such a phenomenon is called electrolyte swelling. Since decomposition of electrolytes is accelerated at high temperature, swelling increases when batteries are neglected. When temperature of batteries is elevated, electrolyte is decomposed or side-reaction occurs. Accordingly, gas such as carbon dioxide or carbon monoxide is generated and thus the thicknesses of batteries increase. Meanwhile, thickness increase during high-temperature storage is an important consideration in small batteries. Temperatures of small batteries are rapidly elevated during use thereof, and thus, there are problems in thickness and stability at high temperature.

Thus, there is an urgent need in the art to study a binder and an electrode material that may have strong adhesive strength so as to prevent separation between electrode active material components or separation between an electrode active material and a current collector when manufacturing an electrode and may have strong physical properties so as to achieve structural stability of an electrode by controlling volume expansion of an electrode active material due to repeated charge/discharge and, accordingly, enhance battery performance.

As currently, commercially available representative binders, there are polyvinylidene fluoride (PVdF), styrene-butadiene rubber (SBR)/carboxy methyl cellulose (CMC), etc. In the case of negative electrodes having great volume expansion during charge/discharge when compared with positive electrodes, SBR/CMC that is used in a smaller amount than PVdF and has superior binding capacity is used.

A conventional solvent-based binder, i.e., polyvinylidene fluoride (PVdF), does not meet such requirements and thus, recently, a method of using binders prepared by preparing emulsifier particles by aqueous polymerization of styrene-butadiene rubber (SBR) and mixing the emulsifier particles with a neutralizing agent and the like has been proposed and is currently commercially available. These binders are eco-friendly and are used in small amounts, thus increasing battery capacity. However, such a case also exhibits improved adhesive durability due to rubber elasticity but does not exhibit dramatically improved adhesive strength.

Therefore, there is an urgent need to develop a binder that enhances cycle characteristics of a battery, imparts structural stability to an electrode, and has high adhesive strength.

DISCLOSURE

Technical Problem

As described above, a binder having elasticity is preferable, capacity should be maintained after charge/discharge cycles due to superior adhesion and adhesion-holding force in secondary batteries, and thickness increase of an electrode should be minimized due to low electrolyte swelling. For example, electrolyte swelling of SBR latex or thermosetting resin may be affected by crosslinking degree.

The inventors of the present application completed the present invention based on the idea that volume expansion of a battery is decreased at high temperature and, simultaneously, superior adhesion is exhibited when small-diameter conjugated diene latex particles are mixed with acrylic copolymer latex particles having a larger average particle diameter than the small-diameter conjugated diene latex particles in a predetermined ratio, and the mixed particles are applied to a lithium secondary battery.

Technical Solution

In accordance with one aspect of the present invention, provided is a binder composition for secondary batteries, wherein conjugated diene latex particles (A) having an average particle diameter of 50 nm or more and 200 nm or less and acrylic copolymer latex particles (B) having an average particle diameter of 300 nm or more and 700 nm or less are present as independent phases, and the acrylic copolymer latex particles (B) are included in an amount of 1% to 30% by weight based on a mass of a total solid of the composition.

Since the acrylic copolymer latex particles (B) include a functional group for providing adhesion to particle surfaces, electrode adhesion of a binder including the acrylic copolymer latex particles is ultimately enhanced, whereby lithium secondary battery performance may be entirely enhanced.

When the content of the acrylic copolymer latex particles (B) is 1% or more and 30% or less by weight, the conjugated diene latex particles (A) and the acrylic copolymer latex particles (B) are respectively present as independent phases, and thus, adhesion thereof as a binder in an electrode may be enhanced.

Meanwhile, since an acrylic copolymer binder includes a monomer having satisfactory affinity to carbonate-based electrolytes, electrolyte swelling is facilitated and an electrolyte is decomposed or side reaction occurs when a battery is left at high temperature. Accordingly, the thickness of an electrode is increased and, finally, deintercalation of the electrode may be induced.

The inventors of the present application confirmed that, when the content of the acrylic copolymer latex particles (B) is greater than 30% by weight based on the mass of a total solid of the composition, swelling occurs at high temperature and thus the thickness of an electrode is increased, whereby deintercalation of the electrode may be induced.

Accordingly, inventors of the present application enhanced adhesion by controlling the content of the acrylic copolymer latex particles (B) to 30% by weight or less and an average particle diameter of the acrylic copolymer latex particles (B) to 300 nm or more, and thus, enhanced lifespan characteristics of a secondary battery. When the average particle diameter of the acrylic copolymer latex particles (B) is less than 300 nm, adhesion may be deteriorated. When the average particle diameter of the acrylic copolymer latex particles (B) is greater than 700 nm, the acrylic copolymer latex particles (B) may disadvantageously induce resistance.

Here, the average particle diameter of the conjugated diene latex particles (A) is preferably 50 nm or more and 200 nm or less. The conjugated diene latex particles (A) is a binder that exhibits decreased electrolyte swelling at high temperature and has rubber elasticity, thereby thickness increase of an electrode and gas generation are decreased. However, the average particle diameter of the conjugated diene latex particles (A) is less than 50 nm or greater than 200 nm, electrode adhesion is dramatically decreased and thus function as a binder thereof might not be achieved.

The conjugated latex particles (A) may include a polymer of a conjugated diene-based monomer or a conjugated diene-based polymer (a), at least one monomer selected from the group consisting of an acrylate-based monomer (b), a vinyl-based monomer, a (meth)acrylamide-based monomer and a nitrile-based monomer, and at least one monomer selected from the group consisting of unsaturated monocarbonic acid-based monomers (c).

The conjugated diene-based monomer may be a monomer selected from the group consisting of 1,3-butadiene, isoprene, chloroprene, and piperidine.

Description

The conjugated diene-based polymer may be, for example, a polymer of two or more monomers selected from the group consisting of 1,3-butadiene, isoprene, chloroprene, and piperidine, a styrene-butadiene copolymer, an acrylonitrile-butadiene copolymer, a styrene-isoprene copolymer, a polyacrylate-butadiene rubber, an acrylonitrile-butadiene-styrene rubber, an ethylene-propylene-diene-based polymer, partially hydrogenated, epoxidized or brominated forms of the polymers, or a mixture thereof.

The latex particles (B) may include a polymer of (a) a (meth)acrylic ester-based monomer, (b) at least one monomer selected from the group consisting of an acrylate-based monomer, a vinyl-based monomer, a (meth)acrylamide-based monomer and a nitrile-based monomer, and (c) at least one monomer selected from the group consisting of unsaturated carbonic acid-based monomers.

The (meth)acrylic ester-based monomer may be at least one monomer selected from the group consisting of methylpolyacrylate, ethylpolyacrylate, propylpolyacrylate, isopropylpolyacrylate, n-butylpolyacrylate, isobutylpolyacrylate, n-amylpolyacrylate, isoamylpolyacrylate, n-ethylhexylpolyacrylate, 2-ethylhexylpolyacrylate, 2-hydroxyethylpolyacrylate, methylmethacrylate, ethylmethacrylate, propylmethacrylate, isopropylmethacrylate, n-butylmethacrylate, isobutylmethacrylate, n-amylmethacrylate, isoamylmethacrylate, n-hexylmethacrylate, n-ethylhexyl methacrylate, 2-ethylhexyl methacrylate, hydroxyethyl methacrylate and hydroxypropyl methacrylate.

The acrylate-based monomer may be at least one monomer selected from the group consisting of methacryloxy ethylethylene urea, β-carboxy ethylpolyacrylate, aliphatic monopolyacrylate, dipropylene dipolyacrylate, ditrimethylopropane tetracrylate, hydroxyethyl acrylate, dipentaerythriol hexaacrylate, pentaerythriol triacrylate, pentaerythriol tetraacrylate, lauryl acrylate, ceryl crylate, stearyl acrylate, lauryl methacrylate, cetyl methacrylate and stearyl methacrylate.

The vinyl-based monomer may be at least one monomer selected from the group consisting of styrene, α-methylstyrene, β-methylstyrene, p-t-butylstyrene and divinylbenzene.

The (meth)acrylamide-based monomer may be at least one monomer selected from the group consisting of acrylamide, n-methylol acryl amide, n-butoxy methylacrylamide, methacrylamide, n-methylol methacrylamide and n-butoxy methylmethacrylamide.

The nitrile-based monomer may be alkenyl cyanide. In a non-limiting embodiment, the nitrile-based monomer may be may be acrylonitrile, methacrylonitrile, allyl cyanide, etc.

The unsaturated carbonic acid-based monomer may be at least one monomer selected from the group consisting of maleic acid, fumaric acid, methacrylic acid, acrylic acid, glutaric acid, itaconic acid, tetrahydrophthalic acid, crotonic acid, isocrotonic acid and nadic acid.

Methods of preparing the latex particles (A) and the latex particles (B) are not specifically limited and the latex particles (A) and the latex particles (B) may be prepared according to suspension polymerization, emulsion polymerization, seed polymerization, etc. which are publicly known. In a non-limiting embodiment, the binder according to the present invention may include one or more of ingredients such as a polymerization initiator, a crosslinking agent, a coupling agent, a buffer, a molecular weight regulator and an emulsifier.

In a non-limiting embodiment according to the present invention, the latex particles (A) and the latex particles (B) may be prepared according to emulsion polymerization. In this case, the average particle diameters of the latex particles (A) and the latex particles (B) may be controlled by the amount of an emulsifier. In general, there is a trend that particle sizes are decreased with increasing the amount of emulsifier, and particle sizes are increased with decreasing the amount of emulsifier particles. A desired average particle diameter may be realized by controlling particle size, reaction time, reaction stability, etc.

Polymerization temperature and polymerization time may be properly determined according to a polymerization method, polymerization initiator types, etc. For example, polymerization temperature may be 50° C. to 300° C., and polymerization time may be 1 to 20 hours.

As the polymerization initiator, inorganic or organic peroxide may be used and, for example, water-soluble initiators including potassium persulfate, sodium persulfate, ammonium persulfate and the like, and oil-soluble initiators including cumene hydroperoxide, benzoyl peroxide and the like may be used. In addition, to promote initiation reaction of a peroxide, an activator in addition to the polymerization initiator may be further included. As the activator, at least one selected from the group consisting of sodium formaldehyde sulfoxylate, sodium ethylenediaminetetraacetate, ferrous sulfate and dextrose may be used.

The crosslinking agent is a material for facilitating crosslinking of the binder and may be added in an amount of 0 or more to 50% or less by weight based on the weight of the binder. As the crosslinking agent, amines such as diethylene triamine, triethylene tetramine, diethylamino propylamine, xylene diamine and isophorone diamine, acid anhydrides such as dodecyl succinic anhydride and phthalic anhydride, polyamide resin, polysulfide resin, phenolic resin, ethylene glycol dimethacrylate, diethylene glycol dimethacrylate, triethylene glycol dimethacrylate, 1,3-butanediol dimethacrylate, 1,6-hexanediol dimethacrylate, neopentyl glycol dimethacrylate, trimethylolpropane trimethacrylate, trimethylol methane triacrylate, glycidyl methacrylate, etc. may be used. As a grafting agent, aryl methacrylate (AMA), triaryl isocyanurate (TAIC), triaryl amine (TAA), diaryl amine (DAA), etc. may be used.

The coupling agent is a material for increasing adhesive strength between an active material and a binder and is characterized by having two or more functional groups. The coupling agent is included in an amount of 0 or more to 30% or less by weight based on the weight of the binder. So long as one of the functional groups forms a chemical bond through reaction with silicon, tin, or a hydroxyl group or a carboxy group on a surface of a graphite based active material and the other group forms a chemical bond through reaction with the nanoscale composite according to the present invention, the coupling agent is not specifically limited. For example, the coupling agent may be a silane based coupling agent such as triethoxysilylpropyl tetrasulfide, mercaptopropyl triethoxysilane, aminopropyl triethoxysilane, chloropropyl triethoxysilane, vinyl triethoxysilane, methacryloxypropyl triethoxysilane, glycidoxypropyl triethoxysilane, isocyanatopropyl triethoxysilane, cyanatopropyl trimethoxysilane, or the like.

The content of the buffer may be 0% or more and 30% by weight based on the weight of the binder and may be one selected from the group consisting of $NaHCO_3$, $NaOH$, and $NH_4OH$.

For example, as the molecular weight regulator, mercaptan; terpinolene, terpenes such as dipentene and t-terpinene; halogenated hydrocarbon such as chloroform and carbon tetrachloride; etc. may used.

The emulsifier has a hydrophilic group and a hydrophobic group. In a non-limiting embodiment, the emulsifier may be one or more selected from the group consisting of anionic emulsifiers and nonionic emulsifiers.

When a nonionic emulsifier is used with an anionic emulsifier, particle size and particle distribution may be more easily controlled. In addition, electrostatic stabilization of an ionic emulsifier may be provided and additional stabilization of a colloid type through van der Waals forces of polymer particles may be provided. Nonionic emulsifiers are not often used alone since particles that are less stable than in anionic emulsifiers are generated.

An anionic emulsifier may be selected from the group consisting of phosphates, carboxylates, sulfates, succinates, sulfosuccinates, sulfonates and disulfonate. In a non-limiting embodiment, the anionic emulsifier may be selected from the group consisting of sodium alkyl sulfate, sodium polyoxyethylene sulfate, sodium lauryl ether sulfate, sodium polyoxyethylene lauryl ether sulfate, sodium lauryl sulfate, sodium alkyl sulfonate, sodium alkyl ether sulfonate, sodium alkylbenzene sulfonate, sodium linear alkylbenzene sulfonate, sodium alpha-olefin sulfonate, sodium alcohol polyoxyethylene ether sulfonate, sodium dioctyl sulfosuccinate, sodium perfluorooctane sulfonate, sodium perfluorobutane sulfonate, alkyldiphenyloxide disulfonate, sodium dioctyl sulfosuccinate (DOSS), sodium alkyl-aryl phosphate, sodium alkyl ether phosphate, sodium lauroyl sarcosinate, but the present invention is not limited thereto and all anionic emulsifiers that are publicly known may be included.

The nonionic emulsifier may be an ester type, an ether type, an ester-ether type, etc.

In a non-limiting embodiment, the nonionic emulsifier may be polyoxyethylene glycol, polyoxyethylene glycol methyl ether, polyoxyethylene monoallyl ether, polyoxyethylene bisphenol-A ether, polypropylene glycol, polyoxyethyle neophentyl ether, polyoxyethylene cetyl ether, polyoxyethylene lauryl ether, polyoxyethylene oleyl ether, polyoxyethylene stearyl ether, polyoxyethylene decylether, polyoxyethylene octyl ether, or the like, but the present invention is not limited thereto and all nonionic emulsifiers that are publicly known may be included in the present invention.

In a non-limiting embodiment of the present invention, (a) the conjugated diene-based monomer or the conjugated diene-based polymer may be included in an amount of 10% to 97.9% by weight, the monomer of (b) may be included in an amount of 1% to 60% by weight, and the unsaturated carbonic acid-based monomer (c) may be included in an amount of 1% to 20% by weight. Ingredients such as an emulsifier, a buffer and a crosslinking agent may be selectively included in an amount of 0.1% to 10% by weight.

The (meth)acrylic ester-based monomer (a) may be included in an amount of 10% to 97.9% by weight, the monomer of (b) may be included in an amount of 1% to 60% by weight, and the unsaturated carbonic acid-based monomer (c) may be included in an amount of 1% to 20% by weight. Ingredients such as an emulsifier, a buffer and a crosslinking agent may be selectively included in an amount of 0.1% to 10% by weight.

Meanwhile, when the binder is prepared, an antioxidant and a preservative may be added. In particular, when a conjugated diene polymer is included in a binder, deterioration of properties, such as softening or gelation during battery operation may be easily induced and thus lifespan of a battery may be shortened. Accordingly, an antioxidant is preferably used to decrease such property deterioration.

When the latex particles (A) and the latex particles (B) are present as independent phases, adhesion is enhanced. Accordingly, it is very important to prevent agglomeration among particles.

In a preferred embodiment, the particles (A and B) are not agglomerated in a mixture by controlling pH of each of the latex particles (A) and the latex particles (B), thus maintaining independent phases.

When pH of the latex particles (B) is acidic, the latex particles (B) may agglomerate with the latex particles (A). Accordingly, independent phases may be maintained by controlling pH of the latex particles (B) through titration of a base. Here, examples of the base include potassium hydroxide, sodium hydroxide, lithium hydroxide, etc., but the present invention is not limited thereto. In particular, the base may be sodium hydroxide.

In the present invention, the binder composition may further include one or more selected from the group consisting of a viscosity regulator and a filler. Hereinafter, the viscosity regulator and the filler are described in more detail.

In addition, the present invention provides a mixture for secondary battery electrodes including an electrode active material that stores/releases the binder composition and lithium. The mixture of secondary battery electrodes may additionally a include conductive material. Hereinafter, the conductive material is described in more detail.

Preferred embodiments of the electrode active material include a lithium transition metal oxide powder or a carbon powder. In addition, the present invention provides an electrode for secondary batteries wherein the mixture for electrodes is coated on a current collector. The electrode may be prepared by coating the mixture for electrodes on a current collector and then drying and rolling. The electrode for secondary batteries may be a positive electrode or a negative electrode.

For example, the positive electrode is prepared by spreading a mixture of the positive electrode active material, the conductive material, the binder, and the like on the positive electrode collector and then drying, and the negative electrode is prepared by spreading a mixture of the negative electrode active material, the conductive material, the binder, and the like on the negative electrode collector and then drying. In some cases, a negative electrode might not include a conductive material.

The positive electrode active material includes two or more transition metals as a lithium transition metal oxide and, for example, may be a layered compound such as a lithium cobalt oxide ($LiCoO_2$), lithium nickel oxide ($LiNiO_2$) and the like substituted with one or more transition metals; lithium manganese oxide substituted with one or more transition metals; lithium nickel-based oxide represented by formula, $LiNi_{1-y}M_yO_2$ (where M includes at least one of Co, Mn, Al, Cu, Fe, Mg, B, Cr, Zn and Ga, and $0.01 \leq y \leq 0.7$); lithium nickel cobalt manganese complex oxide represented by $Li_{1+z}Ni_bMn_cCo_{1-(b+c+d)}M_dO_{(2-e)}A_e$ (where $-0.5 \leq z \leq 0.5$, $0.1 \leq b \leq 0.8$, $0.1 \leq c \leq 0.8$, $0 \leq d \leq 0.2$, $0 \leq e \leq 0.2$ and $b+c+d<1$, M is Al, Mg, Cr, Ti, Si or Y, and A is F, P or Cl) such as $Li_{1+z}Ni_{1/3}Co_{1/3}Mn_{1/3}O_2$, $Li_{1+z}Ni_{0.4}Mn_{0.4}Co_{0.2}O_2$ and the like; olivine-based lithium metal phosphate represented by $Li_{1+x}M_{1-y}M'_yPO_{4-z}X_z$ (where M is transition metal, preferably Fe, Mn, Co or Ni; M' is Al, Mg or Ti, X is F, S or N, $-0.5 \leq x \leq +0.5$, $0 \leq y \leq 0.5$, and $0 \leq z \leq 0.1$); and the like, but the present invention is not limited thereto.

The negative electrode active material according to the present invention may be, for example, carbon and graphite materials such as natural graphite, artificial graphite, expandable graphite, carbon fiber, hard carbon, carbon black, carbon nanotubes, fullerenes, and activated carbon; metals alloyable with lithium such as Al, Si, Sn, Ag, Bi, Mg, Zn, In, Ge, Pb, Pd, Pt and Ti and compounds including these elements; complexes of metals and compounds thereof and complexes of carbon and graphite materials; and lithium-containing nitrides. Thereamong, a carbon-based active material, a silicon-based active material, a tin-based active material, or a silicon-carbon-based active material is more preferable and may be used alone or in combination of two or more thereof.

The conductive material is a component to further enhance conductivity of an electrode active material and may be added in an amount of 0.01% to 30% by weight based on the total weight of the electrode mixture. The conductive material is not particularly limited so long as it has conductivity and does not cause chemical changes in the fabricated battery. Examples of conductive materials include graphite such as natural or artificial graphite; carbon black such as carbon black, acetylene black, Ketjen black, channel black, furnace black, lamp black, and thermal black; carbon derivatives such as carbon nanotube and fullerene; conductive fibers such as carbon fiber and metallic fibers; metallic powders such as carbon fluoride powder, aluminum powder, and nickel powder; conductive whiskers such as zinc oxide and potassium titanate; conductive metal oxides such as titanium oxide; and polyphenylene derivatives.

An electrode collector of the electrode is a portion in which electrons move through electrochemical reaction of an active material. In accordance with electrode types, an electrode collector is classified into a positive electrode collector and a negative electrode collector.

The positive electrode current collector is typically fabricated to a thickness of 3 to 500 µm. Such a positive electrode current collector is not particularly limited so long as it does not cause chemical changes in the fabricated secondary battery and has high conductivity. For example, the positive electrode current collector may be made of stainless steel, aluminum, nickel, titanium, sintered carbon, or aluminum or stainless steel surface-treated with carbon, nickel, titanium, or silver.

The negative electrode current collector is typically fabricated to a thickness of 3 to 500 µm. The negative electrode current collector is not particularly limited so long as it does not cause chemical changes in the fabricated secondary battery and has conductivity. For example, the negative electrode current collector may be made of copper, stainless steel, aluminum, nickel, titanium, sintered carbon, copper or stainless steel surface-treated with carbon, nickel, titanium, or silver, and aluminum-cadmium alloys.

The current collectors may have fine irregularities at a surface thereof to enhance adhesion of an electrode active material. In addition, the negative electrode current collector may be used in various forms including films, sheets, foils, nets, porous structures, foams, and non-woven fabrics.

The mixture (electrode mixture) of an electrode active material, a conductive material, a binder, and the like may further include at least one material selected from the group consisting of a viscosity controlling agent and a filler.

The viscosity controlling agent is an ingredient for controlling the viscosity of an electrode mixture so as to facilitate a mixing process of an electrode mixture and a process of spreading the same over a collector and may be added in an amount of maximally 30% by weight based on the total weight of the electrode mixture. Examples of such a viscosity controlling agent include carboxymethylcellulose, polyacrylic acids, etc., but the present invention is not limited thereto.

The filler is used as a component to inhibit positive electrode expansion and is optionally used. The filler is not particularly limited so long as it is a fibrous material that does not cause chemical changes in the fabricated secondary battery. Examples of the filler include olefin-based polymers such as polyethylene and polypropylene; and fibrous materials such as glass fiber and carbon fiber.

The present invention provides a lithium secondary battery including the electrode.

Generally, the lithium secondary battery further includes a separator and a lithium salt-containing non-aqueous electrolyte in addition to an electrode.

The separator is disposed between the positive electrode and the negative electrode. As the separator, an insulating thin film having high ion permeability and mechanical strength is used. A pore diameter of the separator is typically 0.01 to 10 μm and a thickness thereof is typically 5 to 300 μm. Examples of such a separator include sheets or nonwoven fabrics made of an olefin polymer such as polypropylene, glass fibers, or polyethylene, which have chemical resistance and hydrophobicity. When a solid electrolyte is used as an electrolyte, the solid electrolyte also functions as a separator.

The lithium-containing non-aqueous electrolyte is composed of a non-aqueous electrolyte and a lithium salt.

Examples of the non-aqueous electrolyte include aprotic organic solvents such as N-methyl-2-pyrollidinone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, etc.

The lithium salt is a material that is readily soluble in the non-aqueous electrolyte. Examples thereof include LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, (CF$_3$SO$_2$)$_2$NLi, chloroborane lithium, lower aliphatic carboxylic acid lithium, lithium tetraphenyl borate, and imides.

As desired, an organic solid electrolyte, an inorganic solid electrolyte and the like may be used.

Examples of the organic solid electrolyte include, but are not limited to, polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include, but are not limited to, nitrides, halides and sulfates of lithium (Li) such as Li$_3$N, LiI, Li$_5$NI$_2$, Li$_3$N—LiI—LiOH, LiSiO$_4$, LiSiO$_4$—LiI—LiOH, Li$_2$SiS$_3$, Li$_4$SiO$_4$, Li$_4$SiO$_4$—LiI—LiOH, Li$_3$PO$_4$—Li$_2$S—SiS$_2$.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, and aluminum trichloride may be added to the non-aqueous electrolyte. If necessary, in order to impart incombustibility, the electrolyte may further include halogen-containing solvents such as carbon tetrachloride and ethylene trifluoride. Further, in order to enhance high-temperature storage characteristics, the electrolyte may further include carbon dioxide gas, fluoro-ethylene carbonate (FEC), propenesultone (PRS), fluoro-propylene carbonate (FPC), etc.

The secondary battery according to the present invention may be used in battery cells that are used as power sources in small devices, preferably as unit cells of medium/large battery modules including a plurality of battery cells that are used as power sources of medium/large devices.

Specific examples of the medium/large devices include, but are not limited to, electric motor-driven power tools; electric vehicles (EVs), hybrid electric vehicles (HEVs), and plug-in hybrid electric vehicles (PHEVs); electric two-wheeled vehicles such as e-bikes and e-scooters; electric golf carts; and systems for storing power.

MODE FOR INVENTION

Now, the present invention will be described in more detail with reference to the accompanying drawings. These examples are provided for illustrative purposes only and should not be construed as limiting the scope and spirit of the present invention.

EXAMPLE 1

<1-1 Preparation of Small-Diameter Latex Particles (A1)>

59 g of 1,3-butadiene, 39 g of styrene and 2 g of acrylic acid as monomers, 0.4 g of NaHCO$_3$ and 0.4 g of sodium lauryl sulfate as buffers, and 0.9 g of dodecyl mercaptan as a molecular weight regulator were input batchwise and mixed. Temperature was elevated to 80° C. and then potassium persulfate as a polymerization was added thereto to initiate reaction. Subsequently, reaction was performed while maintaining 80° C. for six hours to obtain small-diameter butadiene latex particles (A1). pH was adjusted to neutral (pH7) using sodium hydroxide. An average particle diameter of polymerized latex particles was 130 nm. Since an average particle diameter is controlled by the amount of emulsifier, the sizes of particles are decreased with increasing amount of emulsifier. Accordingly, the amount of emulsifier used may be controlled considering a desired size, reaction time, reaction stability, etc.

<1-2 Preparation of Large-Diameter Latex Particles (B1)>

59 g of butyl acrylate, 39 g of styrene, 2 g of glycidyl methacrylate, 8 g of a mixture of acrylic acid and itaconic acid, 1 g of diethylene triamine, and 0.7 g of a mixture of sodium lauryl sulfate and polyoxyethylene lauryl ether as monomers, and 0.4 g of NaHCO$_3$ as a buffer were input and mixed. Temperature was elevated up to 75° C. and then ammonium persulfate as a polymerization initiator was added, followed by polymerizing. Reaction was preformed for four hours while maintain 75° C., thereby preparing large-diameter latex particles (B1). An average particle diameter of the latex particles was 420 nm and pH was adjusted to neutral (pH7) using sodium hydroxide.

<1-3 Preparation of Binder Composition>

The obtained small-diameter latex particles (A1) and the large-diameter latex particles (B1) were mixed in a ratio of 90:10 by a mass ratio of a solid to prepare a binder composition. After mixing, the sizes of latex particles were analyzed using a submicron particle sizer (Nicomp™ 380). It was confirmed that agglomeration did not occur.

<1-4 Preparation of Electrode Slurry and Electrode>

To prepare a negative electrode, water as a dispersion medium was used and 96.9 g of natural graphite, 0.4 g of acetylene black, 1.5 g of the binder for secondary batteries prepared above, and 1.2 g of carboxymethylcellulose as a thickener were mixed based on 100 g of total solids. A slurry for the negative electrode was prepared such that the content of total solids was 55% by weight, and then spread on copper foil to a thickness of 100 micrometers. Subsequently, the spread slurry was vacuum-dried and then pressed, thereby preparing a negative electrode.

To prepare a positive electrode, N-methyl-2-pyrrolidone (NMP) was used as a dispersion medium. 96 g of $LiCoO_2$ as an active material, 2 g of acetylene black, and 2 g of a PVDF binder were mixed to prepare a slurry. The resultant slurry was coated over aluminum foil to a thickness of 100 micrometers and then dried, followed by pressing. As a result, a positive electrode was manufactured.

<1-5 Manufacture of Lithium Secondary Battery>

An opening with a surface area of 13.33 $cm^2$ was formed in the manufactured negative electrode plate and an opening with a surface area of 12.60 $cm^2$ was formed in a positive electrode plate, thereby completing manufacture of a mono cell. A tab was attached to upper portions of the positive electrode and the negative electrode and a separator made of a microporous polyolefin film was interposed between the negative electrode and the positive electrode, followed by loading in an aluminum pouch. Subsequently, 500 mg of an electrolyte was injected into the pouch. To prepare the electrolyte, a solvent of ethyl carbonate (EC):diethyl carbonate (DEC):ethyl-methyl carbonate (EMC) mixed in a volume ratio of 4:3:3 was used and a $LiPF_6$ as an electrolyte was dissolved in a concentration of 1 M in the solvent. Subsequently, the pouch was sealed using a vacuum packaging machine and stood for 12 hours at room temperature. Subsequently, constant-current charging was performed in a ratio of approximately 0.05 and then constant-voltage charge was performed to maintain voltage until the current is decreased by approximately ⅙. In this regard, since gases are generated inside the cell, degassing and resealing were preformed. As a result, a lithium secondary battery was completed.

EXAMPLE 2

A lithium secondary battery was prepared in the same manner as in Example 1, except that the small-diameter latex particles (A1) and the large-diameter latex particles (B1) were mixed in a ratio of 80:20 by a mass ratio of a solid to prepare a binder composition.

EXAMPLE 3

A lithium secondary battery was prepared in the same manner as in Example 1, except that the small-diameter latex particles (A1) and the large-diameter latex particles (B1) were mixed in a ratio of 70:30 by a mass ratio of a solid to prepare a binder composition.

EXAMPLE 4

A lithium secondary battery was prepared in the same manner as in Example 1, except that an average particle diameter of the small-diameter latex particles (A1) was adjusted to 170 nm (A2).

EXAMPLE 5

A lithium secondary battery was prepared in the same manner as in Example 2, except that an average particle diameter of the small-diameter latex particles (A1) was adjusted to 170 nm (A2).

EXAMPLE 6

A lithium secondary battery was prepared in the same manner as in Example 3, except that an average particle diameter of the small-diameter latex particles (A1) was adjusted to 170 nm (A2).

EXAMPLE 7

A lithium secondary battery was prepared in the same manner as in Example 1, except that an average particle diameter of the large-diameter latex particles (B1) was adjusted to 310 nm (B2).

EXAMPLE 8

A lithium secondary battery was prepared in the same manner as in Example 2, except that an average particle diameter of the large-diameter latex particles (B1) was adjusted to 310 nm (B2).

EXAMPLE 9

A lithium secondary battery was prepared in the same manner as in Example 3, except that an average particle diameter of the large-diameter latex particles (B1) was adjusted to 310 nm (B2).

EXAMPLE 10

A lithium secondary battery was prepared in the same manner as in Example 1, except that an average particle diameter of the large-diameter latex particles (B1) was adjusted to 700 nm (B3).

EXAMPLE 11

A lithium secondary battery was prepared in the same manner as in Example 2, except that an average particle diameter of the large-diameter latex particles (B1) was adjusted to 700 nm (B3).

EXAMPLE 12

A lithium secondary battery was prepared in the same manner as in Example 3, except that an average particle diameter of the large-diameter latex particles (B1) was adjusted to 700 nm (B3).

COMPARATIVE EXAMPLE 1

A lithium secondary battery was prepared in the same manner as in Example 1, except that the small-diameter latex particles (A1) and the large-diameter latex particles (B1) were mixed in a ratio of 50:50 by a mass ratio of a solid to prepare a binder composition.

COMPARATIVE EXAMPLE 2

A lithium secondary battery was prepared in the same manner as in Example 1, except that the small-diameter latex particles (A1) and the large-diameter latex particles (B1) were mixed in a ratio of 30:70 by a mass ratio of a solid to prepare a binder composition.

COMPARATIVE EXAMPLE 3

A lithium secondary battery was prepared in the same manner as in Example 1, except that only the small-diameter latex particles (A1) were added to a binder composition.

COMPARATIVE EXAMPLE 4

A lithium secondary battery was prepared in the same manner as in Example 1, except that only the small-diameter latex particles (A2) were added to a binder composition.

COMPARATIVE EXAMPLE 5

A lithium secondary battery was prepared in the same manner as in Example 1, except that only the large-diameter latex particles (B1) were added to a binder composition.

COMPARATIVE EXAMPLE 6

A lithium secondary battery was prepared in the same manner as in Example 1, except that an average particle diameter of the small-diameter latex particles (A1) was adjusted to 220 nm.

COMPARATIVE EXAMPLE 7

A lithium secondary battery was prepared in the same manner as in Example 1, except that an average particle diameter of the large-diameter latex particles (B1) was adjusted to 250 nm.

COMPARATIVE EXAMPLE 8

A lithium secondary battery was manufactured in the same manner as in Example 1, except that a negative electrode was manufactured using a slurry for negative electrodes in which NMP was used as a dispersion medium and 95 parts by weight of natural graphite, 1 part by weight of acetylene black, and 4 parts by weight of PVDF binder were added to NMP and dispersed therein.

EXPERIMENTAL EXAMPLE 1

<Adhesion Test>

When the binder according to each of Examples 1 to 12 and Comparative Examples 1 to 8 was used in a negative electrode, adhesion between a composition for the negative electrode and a current collector was measured. The negative electrode plate manufactured according to each of Examples 1 to 12 and Comparative Examples 1 to 8 was cut to a constant size and fixed to a slide glass. Subsequently, 180 degree peel strength was measured while peeling a current collector. Results are summarized in Table 1 below.

For evaluation, five or more peel strengths were measured and an average value thereof was determined.

EXPERIMENTAL EXAMPLE 2

<Battery Test>

A charge/discharge test of each of the batteries manufactured according to Examples 1 to 7 and Comparative Examples 1 to 4 was carried out. First, a charge/discharge test was carried out two times at a charge/discharge current of 0.2 C, a charge final voltage of 4.2 V (Li/Li+), and a discharge final voltage of 2.5 V (Li/Li+). Subsequently, another charge/discharge test was carried out 48 times at a charge/discharge current density of 1 C, a charge final voltage of 4.2 V (Li/Li+), and a discharge final voltage of 3 V (Li/Li+). All charging was carried out at a constant current/constant voltage and a final current of constant voltage charge was 0.05 C. After completing a test of the total of 50 cycles, charge/discharge efficiency at a first cycle (initial efficiency and capacity retention ratio after 50 cycles) was found. In addition, a charge capacity at a 50th cycle was divided by a charge capacity at the first cycle to find a capacity ratio (50th/1st). The found capacity ratio was regarded as a capacity retention ratio. Results are summarized in Table 1 below.

TABLE 1

| | Adhesion (gf/cm) | Coating characteristics | Initial efficiency (%) | Capacity maintenance ratio after 50 cycles (%) |
|---|---|---|---|---|
| Example 1 | 37.5 | ○ | 92.5 | 91.7 |
| Example 2 | 36.4 | ○ | 92.1 | 91.8 |
| Example 3 | 36.1 | ○ | 92.3 | 91.5 |
| Example 4 | 36.1 | ○ | 92.0 | 91.2 |
| Example 5 | 35.9 | ○ | 92.3 | 90.9 |
| Example 6 | 35.7 | ○ | 92.1 | 91.3 |
| Example 7 | 35.4 | ○ | 92.5 | 91.1 |
| Example 8 | 36.0 | ○ | 92.8 | 91.3 |
| Example 9 | 35.2 | ○ | 92.1 | 91.7 |
| Example 10 | 37.9 | ○ | 92.0 | 91.5 |
| Example 11 | 36.7 | ○ | 92.1 | 90.4 |
| Example 12 | 37.8 | ○ | 92.4 | 91.9 |
| Comparative Example 1 | 15.7 | X | 88.9 | 88.8 |
| Comparative Example 2 | 15.2 | X | 88.3 | 86.9 |
| Comparative Example 3 | 16.5 | ○ | 91.4 | 91.5 |
| Comparative Example 4 | 16.9 | ○ | 91.3 | 90.7 |
| Comparative Example 5 | 17.8 | ○ | 91.9 | 91.9 |
| Comparative Example 6 | 15.7 | ○ | 90.9 | 90.9 |
| Comparative Example 7 | 12.9 | ○ | 90.8 | 91.1 |
| Comparative Example 8 | 8 | ○ | 89.1 | 87.5 |

As shown in the experimental results, it can be confirmed that, when the small-diameter latex particles (A1) having an average particle diameter of 130 nm and the large-diameter latex particles (B) having an average particle diameter of 420 nm are included (Examples 1 to 3), the small-diameter latex particles (A2) having an average particle diameter of 170 nm and the large-diameter latex particles having an average particle diameter of 420 nm are included (Examples 4 to 6), the small-diameter latex particles (A1) having an average particle diameter of 130 nm and the large-diameter latex particles (B) having an average particle diameter of 310 nm are included (Examples 7 to 9), and the small-diameter latex particles (A1) having an average particle diameter of 130 nm and the large-diameter latex particles (B) having an average particle diameter of 700 nm are included (Examples 10 to 12), the prepared secondary batteries exhibit higher adhesion, higher initial efficiency and higher capacity after 50 charge/discharge cycles indicating enhanced lifespan characteristics, compared to when only the small-diameter latex is used (Comparative Examples 3 to 4), only large-diameter latex is used (Comparative Example 5) or latex particles outside the particle diameter range are used (Comparative Examples 6 to 7), and the natural graphite is used (Comparative Example 8).

Meanwhile, it can be confirmed that, when the large-diameter latex particles (B) are included in an amount of 50% by weight or more (Comparative Examples 1 to 2), coating characteristics are very poor due to two-type particles forming an agglomeration phase and, entire properties such as adhesion, initial efficiency and a capacity maintenance ratio after 50 cycles are dramatically decreased. When different latex particle types are physically mixed, various properties may be realized and costs are low, but, in most cases, two latex types are not mixed well, thereby forming an incompatible blend. In particular, in the present invention, the particles (A and B) are not agglomerated in a mixture and maintain independent phases when the conjugated diene-based latex particles (A) are included in an amount of 70% by weight or more. Accordingly, it seems that a composition ratio of a mixture as well as pH control affects latex agglomeration. Since the two latex particle types have differences in monomer compositions, a surface state, properties, viscosity, particle sizes, etc., ideal latex blending may be performed without agglomeration when properties between the two latex particle types are similar and thus desired properties may be realized.

EXPERIMENTAL EXAMPLE 3

<Battery Test>

In the battery manufactured according to each of Examples 1 to 12 and Comparative Examples 1 to 8, the thickness of the electrode was measured before and after a charge/discharge test, and a thickness change ratio (%) was calculated. Results are summarized in Table 2 below. First, a charge/discharge test was performed twice at a charge/discharge current density of 0.2 C, a charge termination voltage of 4.2 V (Li/Li+) and a termination voltage of 2.5 V (Li/Li+). Subsequently, a charge/discharge test was performed 298 times at a charge/discharge current density of 1 C, a charge termination voltage of 4.2 V (Li/Li+) and a discharge termination voltage of 3 V (Li/Li+). In all cases, charging was performed at constant current/constant voltage and a termination current of constant-voltage charge was 0.05 C. After completing a total of 300 cycles, the thickness of a battery was measured and a thickness change ratio in a battery before and after charge/discharge was calculated. This was carried out to confirm whether a binder affected volume expansion of a battery.

TABLE 2

|  | Thickness change ratio before and after charge/discharge (%) |
| --- | --- |
| Example 1 | 21.2 |
| Example 2 | 22.6 |
| Example 3 | 23.7 |
| Example 4 | 21.3 |
| Example 5 | 22.7 |
| Example 6 | 22.9 |
| Example 7 | 21.9 |
| Example 8 | 22.0 |
| Example 9 | 23.2 |
| Example 10 | 21.0 |
| Example 11 | 21.7 |
| Example 12 | 22.9 |
| Comparative Example 1 | 33.4 |
| Comparative Example 2 | 32.9 |
| Comparative Example 3 | 24.1 |
| Comparative Example 4 | 23.8 |
| Comparative Example 5 | 34.8 |
| Comparative Example 6 | 24.6 |
| Comparative Example 7 | 35.7 |
| Comparative Example 8 | 26.1 |

As shown in the experimental results, it can be confirmed that, when the small-diameter latex particles (A1) having an average particle diameter of 130 nm and the large-diameter latex particles (B) having an average particle diameter of 420 nm are included (Examples 1 to 3), the small-diameter latex particles (A2) having an average particle diameter of 170 nm and the large-diameter latex particles having an average particle diameter of 420 nm are included (Examples 4 to 6), the small-diameter latex particles (A1) having an average particle diameter of 130 nm and the large-diameter latex particles (B) having an average particle diameter of 310 nm are included (Examples 7 to 9), and the small-diameter latex particles (A1) having an average particle diameter of 130 nm and the large-diameter latex particles (B) having an average particle diameter of 700 nm are included (Examples 10 to 12), the prepared secondary batteries have a smaller electrode thickness increase ratio due to decreased gas generation, compared to when only the small-diameter latex is used (Comparative Examples 3 to 4), only large-diameter latex is used (Comparative Example 5) or the latex particles out of the particle diameter range are used (Comparative Examples 6 to 7), and the natural graphite is used (Comparative Example 8)

As a result, it can be confirmed that, when the small-diameter latex particles (A) having an average particle diameter of 50 nm or more and 200 nm or less are included in an amount of 70% by weight or more, and the acrylic copolymer large-diameter latex particles (B) having an average particle diameter of 200 nm or more and 700 nm or less are included in an amount of 30% by weight or less, adhesion is greatly enhanced and superior coating characteristics, initial capacity and initial efficiency, etc. are exhibited indicating that properties thereof are entirely, very superior.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As described above, when the binder composition according to the present invention is applied to an electrode mixture and lithium secondary battery, superior binding force may be maintained between electrode materials and between an electrode material and a current collector, which suffer volume change during charge/discharge, and a secondary battery having superior initial capacity and a superior capacity maintenance ratio after 50 cycles may be provided. In addition, thickness increase and gas generation are decreased at high temperature and thus swelling is decreased, whereby a battery having enhanced safety may be provided.

The invention claimed is:

1. An electrode for secondary batteries, comprising:
a current collector; and
an electrode mixture directly disposed on the current collector, wherein the electrode mixture comprises a binder composition and an electrode active material,
wherein the binder composition comprises conjugated diene latex particles (A) having an average particle diameter of 50 nm or more and 200 nm or less and acrylic copolymer latex particles (B) having an average particle diameter of 300 nm or more and 700 nm or less are present as independent phases, and the acrylic copolymer latex particles (B) are comprised in an amount of 10% to 30% by weight based on a total weight of the binder composition,
wherein the conjugated diene latex particles (A) are prepared by polymerization of (a) a conjugated diene-based monomer in an amount of 35 percent by weight (wt %) to 75 wt %, (b) a vinyl-based monomer in an amount of 20 wt % to 60 wt %, and (c) an unsaturated carbonic acid-based monomer in an amount of 1 wt % to 5 wt %, based on a total amount of monomers for forming the conjugated diene latex particles (A),
wherein the acrylic copolymer latex particles (B) are prepared by polymerization of (a) a first (meth)acrylic ester-based monomer and a second (meth)acrylic ester-based monomer in an amount of 47 wt % to 80 wt %, (b) a vinyl-based monomer in an amount of 11 wt % to 52 wt %, and (c) an unsaturated carbonic acid-based monomer in an amount of 1 wt % to 10 wt %, based on a total amount of monomers for forming the acrylic copolymer latex particles (B),
wherein the conjugated diene-based monomer is 1,3-butadiene, isoprene, or a mixture thereof,
wherein the first and second (meth)acrylic ester-based monomers are selected from the group consisting of methylacrylate, ethylacrylate, prop ylacrylate, n-butylacrylate, n-ethylhexylacrylate, 2-ethylhexylacrylate, methylmethacrylate, ethylmethacrylate, propylmethacrylate, n-butylmethacrylate, n-hexylmethacrylate, n-ethylhexyl methacrylate, 2-ethylhexyl methacrylate, and glycidyl methacrylate,
wherein the first and second (meth)acrylic ester-based monomers are not the same monomers,
wherein the vinyl-based monomers of the conjugated diene latex particles (A) and the acrylic copolymer latex particles (B) are independently selected from the group consisting of styrene, α-methylstyrene, β-methylstyrene, p-t-butylstyrene and divinylbenzene,
wherein the unsaturated carbonic acid-based monomers of the conjugated diene latex particles (A) and the acrylic copolymer latex particles (B) are independently selected from the group consisting of maleic acid, fumaric acid, methacrylic acid, acrylic acid, glutaric acid, itaconic acid, crotonic acid, isocrotonic acid, and mixtures thereof.

2. A lithium secondary battery comprising the electrode for secondary batteries according to claim 1.

3. The electrode of claim 1, wherein the first and second (meth)acrylic ester-based monomers are selected from the group consisting of n-butylacrylate, 2-ethylhexylacrylate, methylmethacrylate, and glycidyl methacrylate,
wherein the vinyl-based monomer of the conjugated diene latex particles (A) is selected from the group consisting of styrene, α-methylstyrene, and divinylbenzene,
wherein the vinyl-based monomer of the acrylic copolymer latex particles (B) is selected from the group consisting of styrene and p-t-butylstyrene,
wherein the unsaturated carbonic acid-based monomer of the conjugated diene latex particles (A) is selected from the group consisting of maleic acid, acrylic acid, and itaconic acid, and
wherein the unsaturated carbonic acid-base monomer of the acrylic copolymer latex particles (B) is selected from the group consisting of maleic acid, fumaric acid, acrylic acid, itaconic acid, crotonic acid, and mixtures thereof.

* * * * *